United States Patent [19]

Mitra et al.

[11] Patent Number: 5,426,635
[45] Date of Patent: Jun. 20, 1995

[54] METHOD FOR ADAPTIVE CONTROL OF WINDOWS AND RATES IN NETWORKS

[75] Inventors: Debasis Mitra, Summit; Judith B. Seery, Madison, both of N.J.

[73] Assignee: AT&T Corp., Murray Hill, N.J.

[21] Appl. No.: 118,531

[22] Filed: Sep. 8, 1993

[51] Int. Cl.⁶ .................................. H04L 12/56
[52] U.S. Cl. ............................. 370/60; 370/84
[58] Field of Search ............... 370/84, 94.1, 60, 85.2, 370/85.3

[56] References Cited

U.S. PATENT DOCUMENTS

| | | | |
|---|---|---|---|
| 4,769,810 | 9/1988 | Eckberg, Jr. et al. | 370/60 |
| 4,769,811 | 9/1988 | Eckberg, Jr. et al. | 370/60 |
| 5,014,265 | 5/1991 | Hahne et al. | 370/60 |
| 5,265,091 | 11/1993 | van Landegen | 370/94.1 |

OTHER PUBLICATIONS

C. R. Kalmanek et al., "Hierarchical Round Robin: A Service Discipline for Very High-Speed Networks," presented by S. Keshav at XUNET Student Meeting, Chicago, Ill., Feb. 26, 1990.

S. E. Minzer, "Broadband ISDN and Asynchronous Transfer Mode (ATM)," *IEEE Communications Magazine*, 17–24, 57 (Sep. 1989).

A. E. Kckberg, "B-ISDN/ATM Traffic and Congestion Control," *IEEE Network*, 28–37 (Sep. 1992).

C. Oh et al., "Priority Control ATM for Switching Systems," *IEICE Trans. Commun.*, vol. E75-B, No. 9, 894–905 (Sep. 1992).

H. Kroner et al., "Priority Management in ATM Switching Nodes," *IEEE Journal of Selected Areas in Communications*, vol. 9, No. 3, 418–427 (Apr. 1991).

K. Kubota et al., "Congestion Control for Bursty Video Traffic in Traffic in ATM Networks," *Electronics and Communications in Japan*, Part 1, vol. 75, No. 4, 13–23 (1992).

B. T. Doshi et al., "Congestion Control in ISDN Frame-Relay Networks," *AT&T Technical Journal*, 35–46 (Nov./Dec. 1988).

A. I. Elwalid et al., "Effective Bandwidth of General Markovian Traffic Sources and Admission Control of High Speed Networks," *IEEE INFOCOM'93*, 256–264 (1993).

R. Guerin et al., "Equivalent Capacity and Its Applications to Bandwidth Allocation in High-Speed Networks," *IEEE Journal on Selected Areas in Communications*, vol. 9, No. 7, 968–981 (Sep. 1991).

V. Jacobson, "Congestion Avoidance and Control," *ACM SIGCOMM'88 (1988)*.

K. K. Ramakrishnan et al., "A Binary Feedback Scheme for Congestion Avoidance in Computer Networks with a Connectionless Network Layer," *ACM SIGCOMM'88 (1988)*.

I. W. Habib et al., "Controlling Flow and Avoiding Congestion in Broadband Networks," *IEEE Communications Magazine*, 46–53 (Oct. 1991).

H. Gilbert et al., "Developing a Cohesive Traffic Management Strategy for ATM Networks," *IEEE Communications Magazine*, 36–45 (Oct. 1991).

A. E. Eckberg, et al., "Controlling Congestion in B-ISDN/ATM: Issues and Strategies," *IEEE Communications Magazine*, 64–70 (Sep. 1991).

J. W. Roberts, "Variable-Bit-RateTraffic Control in B-ISDN," *IEEE Communications Magazine*, 50–56 (Sep. 1991).

(List continued on next page.)

*Primary Examiner*—Douglas W. Olms
*Assistant Examiner*—Min Jung
*Attorney, Agent, or Firm*—Katharyn E. Olson

[57] ABSTRACT

Methods are disclosed for the adaptive control of windows and rates in networks. A periodic, one-bit feedback signal is combined with systematic damping and control of a gain signal to achieve a minimum bandwidth and a fair share of excess available bandwidth among virtual circuits in the network in a timely manner. The methods are demonstrated using a First-Come-First-Served service discipline, a Weighted Round-Robin service discipline, or a combination of the two disciplines.

28 Claims, 6 Drawing Sheets

OTHER PUBLICATIONS

D. Hong et al., "Congestion Control and Prevention in ATM Networks," *IEEE Network Magazine*, 10–16 (Jul. 1991).

D. Mitra et al., "Dynamic Adaptive Windows for High Speed Data Networks; Theory and Simulations," *Proc. ACM Sigcomm'90*, 30–37 (1990).

D. Mitra et al., "Dynamic Adaptive Windows for High Speed Data Networks with Multiple Paths and Propagation Delays," *Computer Networks and ISDN Systems*, vol. 25, 663–679 (1993).

A. Mukherjee et al., "Analysis of Dynamic Congestion Control Protocols–A Fokker–Planck Approximation," ACM 159–169 (1991).

K. W. Fendick et al., "Analysis of a Rate–Based Feedback Control Strategy for Long Haul Data Transport," Elsevier Science Publishers B. V., 67–84 (1992).

A. Demers et al., "Analysis and Simulation of a Fair Queueing Algorithm," *Internetworking, Research and Experience*, vol. 1,3–26 (1990).

L. Zhang, "Virtual Clock: A New Traffic Control Algorithm for Packet Switching Networks," ACM, 19–29 (1990).

K. W. Fendick et al., "An Approach to High–Performance, High–Speed Data Networks," *IEEE Communications Magazine*, 74–82 (1991).

D. Bertsekas and R. Gallager, *Data Networks*, Second Edition, Prentice Hall, 493–515 (1992).

M. Schwartz, *Telecommunication Networks—Protocols, Modeling and Analysis*, Addison–Wesley Publishing Company, 175–196 (1987).

A. S. Tanenbaum, *Computer Networks*, Second Edition, Prentice Hall, 223–320 (1988).

D. D. Clark et al., "Supporting Real–Time Applications in an Integrated Services Packet Network: Architecture and Mechanism," *Proc. SIGCOMM'92*, 14–26 (1992).

M. Katevenis et al., "Weighted Round–Robin Cell Multiplexing in a General–Purpose ATM Switch Chip," *IEEE Journal on Selected Areas in Communications*, vol. 9, No. 8, 1265–1279 (Oct. 1991).

PHASE 1: $t \varepsilon (t_0, t_1)$
PHASE 2: $t \varepsilon (t_1, t_2)$
PHASE 3: $t \varepsilon (t_2, t_3)$ (a) A=10, Γ=.08, A/Γ=125; λ=264; τ=1.0

(b) A=28, Γ=.08, A/Γ=350; λ=264; τ=1.0

(c) A=40, Γ=.08, A/Γ=500; λ=264; τ=1.0

METHOD FOR ADAPTIVE CONTROL OF WINDOWS AND RATES IN NETWORKS

TECHNICAL FIELD

This invention relates to methods for controlling congestion on data networks. In particular, the invention relates to methods for adaptively controlling window sizes and rates of admission of data on the network.

BACKGROUND OF THE INVENTION

The use of data networks for the reliable high speed transport of information, such as text, voice, video, etc., over wide areas in digital format via a variety of media including optical fibers is bringing major changes to network services and network architecture/infrastructure design. Many new services having diverse characteristics and bandwidth requirements are now feasible. One emerging example of such data networks is Broadband ISDN (BISDN), which is designed to support a variety of applications such as interactive and distributed audio, video and data communications. The principal transfer mode for BISDN is called Asynchronous Transfer Mode (ATM). ATM is a high-bandwidth, low delay, packet-like switching and multiplexing technique. See, S. E. Minzer, "Broadband ISDN and Asynchronous Transfer Mode," *IEEE Comm. Mag.*, pp. 17-24, September 1989.

FIG. 1A illustrates a typical high speed network 100 comprising switching nodes 106-i connected by high-bandwidth data links 108-j. Inputs to the network 100 are from user locations 101-k, k=1, 2, ..., NS. These inputs may be of any form, but are conveniently formatted at the user locations into fixed-length packets or cells (the terms will be used interchangeably in the sequel) for transmission to other user locations or to gateway or inter-network nodes 110, which nodes are from a user location 101-k is not in the proper form, switching nodes 106-i are arranged to appropriately format the input data. Communication between user location 101-k (or between a user location and an off-network location, e.g., via link 112) is advantageously via virtual circuits, as is well known in the art.

It proves convenient to associate a so-called "window" with each virtual circuit, which window represents the total number of cells in transit through the virtual circuit at any time. In some networks many cells may be in transit between an originating node, e.g., 106-1 and a terminating node, e.g., 106-2 in FIG. 1A. The in-transit cells may be propagating through a link 106-i, or they may be temporarily queued at one of the nodes along the path of the virtual circuit. Thus the windo size, conveniently identified by the value K (in units of packets or cells), may be fairly large.

Some networks use explicit acknowledgement signals from the terminating node of a virtual circuit back to the originating node of a virtual circuit to indicate the error-free reception of packet or cell. Such acknowledgement signals can then be used to advance the window, thereby admitting a new cell into the virtual circuit. Conversely, when congestion is indicated, e.g., by a feedback signal from a downstream node, or when an error is detected requiring a retransmission between links in the network, the window can shrink or remain stationary. Variants of such "flow control" in the face of errors or congestion are known in the art.

The afore-mentioned queues, when needed, are typically implemented using buffer memory at each node along a virtual circuit. These buffers may be shared, as is typical for the so-called first-come-first-served (FCFS) service discipline, or they may be provided on a per-virtual-circuit basis when using a service discipline such as a round-robin (including weighted round-robin, WRR) discipline. The service discipline, in any event, allocates available node output capacity (e.g., trunk bandwidth) to meet the competing service requirements for each virtual circuit. It sometimes proves advantageous to allocate available bandwidth in light of the nature of the data sources, e.g., giving one class of service for relatively short, bursty inputs and another class of service to virtual circuits carrying large file transfers. In high speed networks, the very great amount of data flowing requires that buffering, allocating and other control functions be performed in a very rapid fashion. It is therefore very important that these functions be performed with minimum complexity.

Some data services are based on an agreed-upon grade of service. For example, a service provider and a user may agree that each virtual circuit (VC) is to have a "Committed Information Rate (CIR)." Thus a quiescent user seeking to start up or commence sending data over a VC expects to receive at least its CIR almost immediately. A number of techniques have been developed to help ensure that competing demands for service are handled in such manner as to minimize congestion and avoid loss of data transmitted within the agreed-upon CIR. See, e.g., U.S. Pat. Nos. 4,769,810 and 4,769,811 issued to Eckberg, et al on Sep. 6, 1988. Congestion control techniques are discussed generally in U.S. Pat. No. 5,014,265 issued May 7, 1991 to Hahne, et al, and in Tanenbaum, Computer Networks, 2nd Ed., Prentice Hall (1988), pp. 223-239, 287-288 and 309-322.

Advantageously, an Admission Controller is used to restrict the total number of VCs at each node, and to monitor the sum of CIRs, for the VCs that have been admitted, to the total bandwidth. See "Performance Evaluation and Design of Multiservice Networks," J. W. Roberts, Ed. Final Report of the Cost 224 Project, Commission of the European Communities (1992); R. Guerin, H. Ahmadi and M. Naghshineh, "Equivalent Capacity and Its Application to Bandwidth Allocation in High-Speed Networks," *IEEE J. Selected Areas Comm.*, vol. 9, pp. 968-981 (1991); A. Elwalid and D. Mitra, "Effective Bandwidth of General Markovian Traffic Sources and Admission Control of High Speed Networks," *IEEE INFOCOM'93*, pp. 256-264 (1993). It is generally desirable that the network control be responsive in providing "bandwidth on demand" to any VC, even if the amount required is in excess of its CIR, provided of course that this can be done while meeting contractual obligations to all VCs which are on at the time.

Fairness is a major goal of feedback-based congestion control. Such fairness typically encompasses several aspects. A first is that a VC should receive at least its CIR at any time it is required. This implies that when a VC turns on from a quiescent state, the network must respond speedily. Second, it is common for a VC to require bandwidth in excess of its CIR. Moreover, given the bursty nature of many sources, it is quite typical for the network to have bandwidth in excess of the sum of the CIRs of the active VCs. Such excess bandwidth is desirably made available to requesting VCs in a rational way, e.g., in proportion to their CIRs. A final desiderata is that fairness hold not only over long time periods, but also over relatively short time periods. "Best Effort" service, wherein the network makes no guarantees but attempts to make bandwidth available fairly, is the particular case of the above in which the CIRs are set to zero.

Feedback can be used to regulate both rates of admission of new data onto the network and window size, so as to respond to demands for bandwidth in an efficient and fair manner. Rates and windows are related in several major respects. In window-based control, a natural rate is the throughput, measured in packets per unit time. In wide area, high-speed networks, the throughput is close to the window size (in packets) per round-trip propagation delay over a broad range of practical operating conditions. This simple relation is the bridge between the two quantities, and thus methods for adapting rates based on feedback are in one-to-one correspondence with methods for adapting windows.

Traffic management and congestion control design of these high speed, wide area networks to ensure efficient bandwidth utilization, bandwidth availability and fairness among users has proved challenging. Some key issues or criteria in evaluating the effectiveness of network traffic management and congestion control methods include: 1) fairness in short and long term behavior among VCs in competing for bandwidth, 2) the effect of large amplitude oscillations in network behavior caused by delayed feedback, 3) transient behavior, i.e. the quality of the responsiveness in a dynamic environment, 4) the ability to arbitrarily allocate bandwidth to different VCs as is typically required, 5) dealing with various propagation delays in the network which sometimes tend to discriminate against VCs on longer paths, 6) fulfilling contractual guarantees from the network to the user and 7) robustness of the design process in terms of network performance sensitivity to parameter values. K. K. Ramakrishnan and R. Jain, "A Binary Feedback Scheme for Congestion Avoidance in Computer Networks with a Connectionless Network Layer," *Proc. ACM SIGCOMM*, pp. 303–313 (1988); V. Jacobson, "Congestion Avoidance and Control," *Proc. ACM SIGCOMM*, pp. 314–329 (1988).

Traffic on the network may be controlled by a variety of methods, e.g. by regulating the admission of new data onto the network, by regulating the window size, etc. See generally, I. W. Habib and T. N. Saadawi, "Controlling Flow and Avoiding Congestion in Broadband Networks," *IEEE Comm. Mag.*, pp. 46–53, October 1991; H. Gilbert, O. Aboul-Magd and V. Phung, "Developing a Cohesive Traffic Management Strategy for ATM Networks," *IEEE Comm. Mag.*, pp. 36–45, October 1991; A. E. Eckberg, B. T. Doshi and R. Zoccolillo, "Controlling Congestion in B-ISDN/ATM: Issues and Strategies," *IEEE Comm. Mag.*, pp. 64–70, September 1991; J. W. Roberts, "Variable-Bit-Rate Traffic Control in B-ISDN," *IEEE Comm. Mag.*, pp. 50–56, September 1991; D. Hong, and T. Suda, "Congestion Control and Prevention in ATM Networks," *IEEE Network Mag.*, pp. 10–16, July 1991. However, any management or congestion control scheme must contend with the physical limitations of the network. In particular, propagation delays (a consequence of the physical area served by the network and the finite speed of signals transmitted over the network) combined with high transmission rates (a consequence of a desire to transmit as much information in the shortest time possible) conspire to create large delay-bandwidth product. Large delay-bandwidth products make traffic regulation on or control of the network difficult because: 1) at any given time a large amount of data is on the network (a consequence of the large bandwidth aspect of the network); 2) feedback signals describing the state of congestion on the network do not instantaneously reach the mechanisms that control network traffic (i.e. the propagation delay aspects); and 3) by the time the feedback signals arrive, additional data is already in transit. Thus, regulation information describing the state of the network is dated, and the controls triggered by the information can result in improper regulation of the network. Improper regulation can lead to the loss of large amounts of data on the network requiring costly and time-consuming retransmission. Additionally, traffic controls can be triggered which can lead to undesirable oscillations in the traffic flow.

Existing algorithms for network traffic management are often based on packet-by-packet adaptation, precision arithmetic and implicit feedback. See generally, D. Mitra and J. B. Seery, "Dynamic Adaptive Windows for High Speed Data Networks: Theory and Simulations," *Proc. ACM SIGCOMM*, 30–40 (1990); D. Mitra and J. B. Seery, "Dynamic Adaptive Windows for High Speed Data Networks with Multiple Paths and Propagation Delays," *Computer Networks and ISDN Systems*, vol. 25, pp. 663–679 (1993); A. Mukherjee and J. C. Strikwerda, "Analysis of Dynamic Congestion Control Protocols—A Fokker-Planck Approximation," *Proc. ACM SIGCOMM*, pp. 159–169 (1991); and K. W. Fendick, M. A. Rodrigues and A. Weiss, "Analysis of Rate-Based Feedback Control Strategy for Long Haul Data Transport," *Performance Evaluation*, vol. 16, pp. 67–84 (1992).

However, new incentives to design other methods have arisen from the availability of a single bit for forward and backward explicit congestion notification, e.g., in the Asynchronous Transfer Mode (ATM) switching format for BISDN. The response-time based algorithms, modified by 1-bit explicit feedback, have been explored using the FCFS service discipline and have proved unsatisfactory in terms of "fairness" of bandwidth allocation between VCs. Excess bandwidth is not allocated fairly to the active VCs in either short-term or long-term. Also, typically, the start-up VC in the presence of established VCs with large bandwidth allocations finds it difficult to obtain its fair share. See, e.g., A. Mukherjee and J. C. Strikwerda, "Analysis of Dynamic Congestion Control Protocols—A Fokker-Planck Approximation," *Proc. ACM SIGCOMM*, pp. 159–169 (1991). Such forms of unfairness are unacceptable, not remedied by tinkering with the design parameters, and fundamentally rooted in the combination of the three features: packet-by-packet adaptation, 1-bit explicit feedback, and FCFS service discipline.

The fairness aspect is improved when the service discipline is changed from FCFS to WRR. This combination is fair to all VCs and gives exemplary performance in all other respects, particularly in responsiveness to changing traffic conditions. A large part of this is derived from the packet-by-packet adaptation, which allows rapid adaptation when the throughput is high. Unfortunately, this same feature is a liability when used in conjunction with the FCFS service discipline. A. Demers, S. Keshav and S. Shenker, "Analysis and Simulation of a Fair Queueing Algorithm," *J. Internetworking Res. Experience*, 3–26 (1990), and L. Zhang, "Virtual Clock: A New Traffic Control Algorithm for Packet Switching Network," *Proc. ACM SIGCOMM*, 19–29

(1990) are illuminating on the role of service disciplines, albeit in the feedback-free framework.

The FCFS service discipline has important advantages: first, memory is more efficiently shared and thus smaller buffer memory usually suffices; second, it is cheaper and simpler to implement. Therefore, there is a need for methods for congestion control which use the FCFS discipline in which, furthermore, processing capability requirements are reduced by adapting rates and windows periodically and relatively infrequently.

The weighted round-robin (WRR) discipline is harder and more expensive to implement. Nonetheless, it has major advantages which make it the discipline of choice for VCs in certain applications. These applications are typically those which require a guaranteed, high grade of service in terms of bandwidth and delay. Isolation from the rest of the network, which the WRR discipline provides, makes such guaranteed performance possible. Desirably, future high speed networks will exploit both the FCFS and WRR disciplines, with VCs requiring guaranteed high grade of service using WRR and other VCs sharing buffers and bandwidth using the FCFS discipline. See D. D. Clark, S. Shanker and L. Zhang, "Supporting Real-Time Applications in an Integrated Services Packet Network: Architecture and Mechanism", Proc. SIGCOMM '92, pp. 14–26, (1992).

SUMMARY OF THE INVENTION

New methods are presented for the adaptive control of windows and rates, especially in networks in which the end-to-end propagation delay is relatively large. These methods may be used, e.g., in the virtual circuit (VC) environment in which the network ideally provides at least the CIR whenever a VC is active and, to the extent possible, makes available additional bandwidth on demand on an equitable basis. One illustrative method advantageously uses (i) periodicity, i.e., time is slotted and a distant switch provides feedback at most once in every time slot, an interval which advantageously may vary from a fraction to a multiple of the round-trip propagation delay; (ii) feedback in the form of a single bit (as used in existing and emerging ATM and Frame Relay standards, for example), which indicates if the instantaneous queue length is above or below a threshold; (iii) a First-Come-First Served service discipline; and (iv) systematic damping and control of a gain signal.

The methods given for the feedback-based adaptive control of windows and rates for the FCFS discipline are used in other illustrative networks where either the WRR discipline is used exclusively or a combination of the FCFS and WRR disciplines are used.

An analytic fluid model of the methods is disclosed which can advantageously be used to select parameters of the method and permit evaluation of the effectiveness of the congestion control methods.

BRIEF DESCRIPTION OF THE DRAWINGS

Other features and advantages of the invention will become apparent from the following detailed description taken together with the drawings in which.

DETAILED DESCRIPTION

I. Overview

Figure 1A:
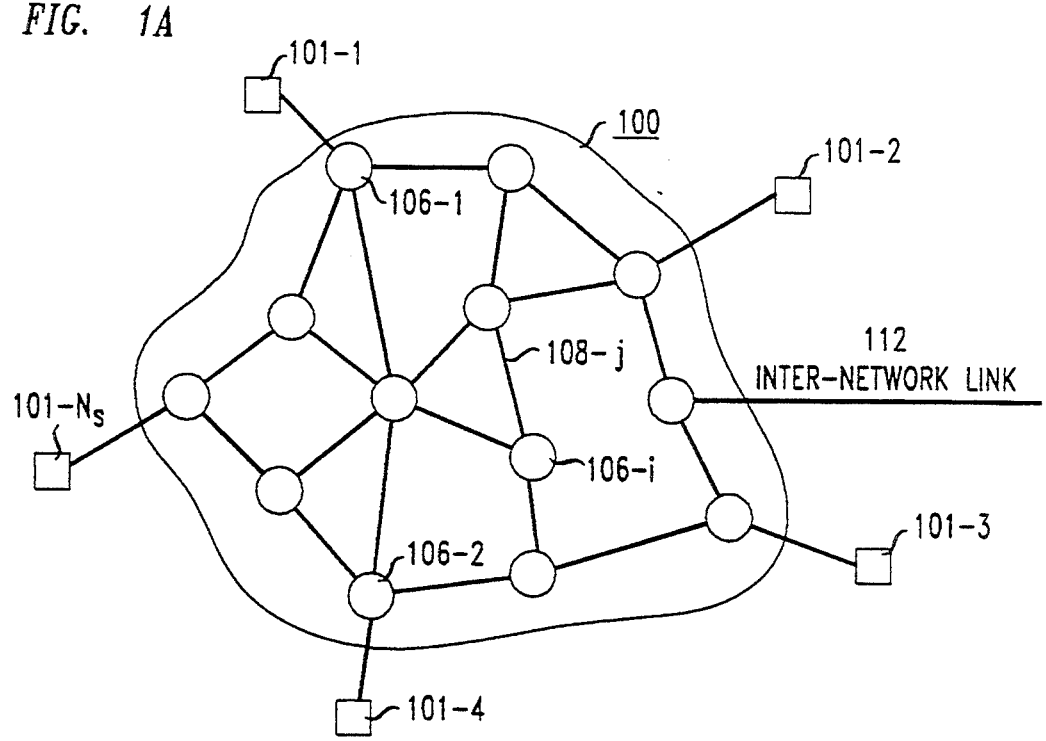
FIG. 1A is a diagram of a generalized data network having a plurality of nodes and connecting links useful in providing virtual circuit communications.
Figure 1B:
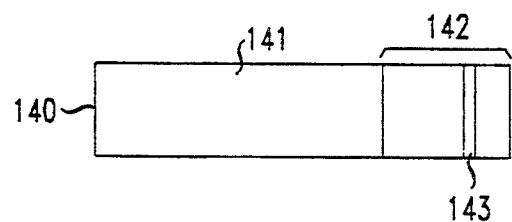
FIG. 1B is an illustrative packet (cell) format for a data communication system like that shown in FIG. 1A.

FIG. 1B shows a typical cell (packet) format useful in systems of the type shown in FIG. 1A. In particular, the format shown in FIG. 1B shows a data portion 141 and a header portion 142. The header or control portion typically contains various address and control information, including a congestion control field 143. Often, the congestion control field may contain only a single bit that is set to a predetermined condition, e.g., to a 1, by a node experiencing congestion through which the cell is passing. If a cell arrives at the end of a VC without having its congestion control field altered to indicate congestion, the receiving user will, upon examining that field, usually conclude that no congestion has been encountered by the cell in its passage through the VC. An appropriate feedback signal can then be sent to the originating user location. Alternatively, intermediate nodes in a VC can likewise conclude that a cell received without its congestion field set to the predetermined condition has not encountered congestion thus far in its travel along the VC. Consequently, the first node in the path of the VC which is experiencing congestion can send an appropriate signal to the originating user location.

Figure 1C:
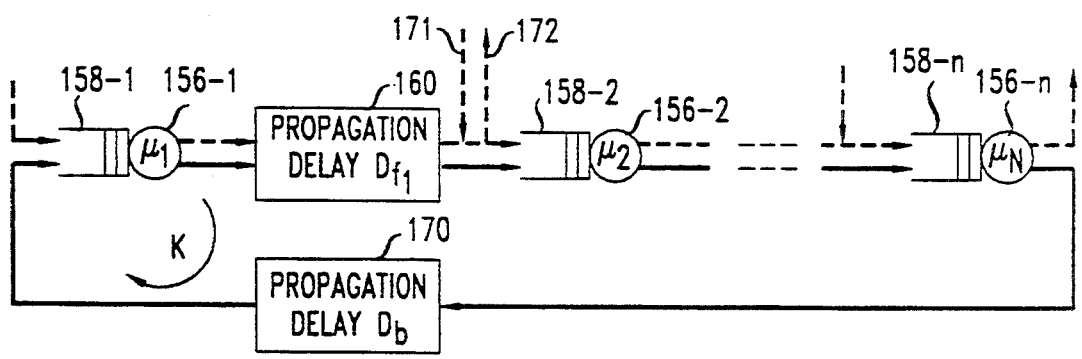
FIG. 1C is representation of a part of the network of FIG. 1A illustrating a virtual circuit with feedback and certain of its features.

FIG. 1C shows in greater detail a particular virtual circuit in the network of FIG. 1A. The elements 158-i and 156-i, i=1,2, ..., M represent the buffers and server function at each node 106-i in the network of FIG. 1A. The $i^{th}$ server is shown having a rate (e.g., transmission capacity) of $\mu_i$. Propagation delay $D_{f,i}$ for the forward direction through the VC between the $i^{th}$ and $(i+1)^{th}$ node, i=1, ... M−1, is represented by the block 160 and the propagation delay for the transmission from the Mth node back to the first node, $D_b$, is represented by the block 170. Feedback, and corresponding feedback delay may be used between nodes other than the last and first in a VC. The window is shown as having a value of K.

The dashed lines 171 and 172, respectively, in FIG. 1C represent virtual circuit traffic leaving and seeking to be added to nodes, such as node 2, through which the subject VC passes. Such other traffic entering at a node competes for resources available at the node with traffic in other VCs at the node. Traffic leaving prior to being presented at a node, e.g., node 2 in FIG. 1C, of course ceases to compete for resources at that node, but may compete at another node along its VC before being finally delivered to its destination.

Figure 2:
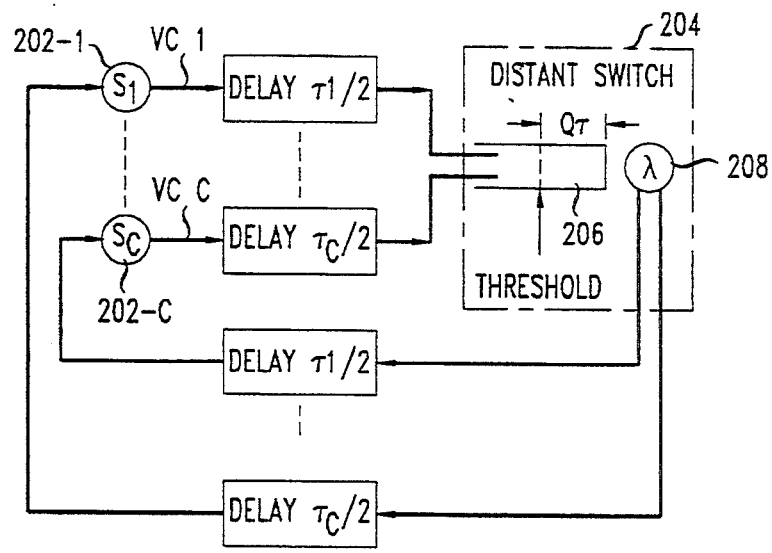
FIG. 2 is a block diagram of a high speed network with feedback and FCFS source.

FIG. 2 is a block diagram of a portion of high speed data network using FCFS service discipline. A plurality of VCs, $VC_j$, $j=1, \ldots, C$, originating at respective sources, $S_j$ and having respective round trip delays $\tau_j$, equally divided between forward and backward paths are shown, for simplicity, connected to only a single switch or node 204. It will be understood that in general a network will include a plurality of nodes 204. The switching node 204 is shown having a shared buffer 206 for queueing cells arriving from VCs; the serving (bandwidth allocation) function is represented by server 208. The various propagation delays for the VCs reflect the general case where sources 202 $S_1$, $S_2$, ... $S_c$ may be located at various geographical sites. In FIG. 2, $\lambda$ and $Q_T$ represent, respectively, the service rate and a queue threshold at node 204. The packet size is assumed constant.

The following sections describe in greater detail methods of congestion control for high speed data networks described above. Initially, the methods described advantageously use the FCFS discipline and explicit, periodic feedback. The feedback signals are advantageously not provided on a cell by cell basis, but rather are periodically sent from the node, such as 204 in FIG. 2, back to the sources $S_i$. The use of periodic feedback considerably reduces the computational complexity and reduces the data flow. These feedback-based adaptation algorithms can also be used in networks which employ the WRR service discipline, as described below in connection with FIG. 9, and in networks which integrate both the FCFS and WRR service disciplines, as shown in FIG. 10.

The feedback is "explicit" in that the switch, e.g., 204 in FIG. 2 accurately generates information to be contained in the congestion field and the network protocol arranges for the sources $S_j$ to receive the information after the unavoidable propagation delay. The periodicity and FCFS features allow for low cost implementations, with the former leading to lower processor costs. Nonetheless, exemplary performance, including fairness in both the short and long terms, is obtained by the novel use of damping associated with a damping value, $\gamma$. As will be seen more fully below, the use of an appropriately selected gain parameter, $\alpha$, effectively suppresses tendencies toward reduced dynamic range and sluggish transient behavior.

Section II describes basic periodic, illustratively 1-bit feedback, adaptive methods as well as various refinements used in conjunction with the FCFS service discipline. Section III gives periodic, 1-bit adaptive methods for use in conjunction with the WRR discipline and combinations of the FCFS and WRR disciplines. Section IV gives analytic results relating to these methods. More particularly, an analytic fluid model is disclosed using two first-order coupled delay-differential equations which reflects the propagation delay across the network. The results of analysis using this model guide the selection of parameters for methods useful in each of two operating regimes, Unsaturated and Saturated. The operating regimes are, in turn, determined by a ratio $\alpha/\gamma$. In steady state the unsaturated regime gives unutilized capacity and oscillation-free flow and empty buffers. In the saturated regime all the bandwidth is utilized and both the flow and queue exhibit oscillations around $\lambda$ and the threshold, respectively. Acceptable adaptability and transient behavior is typically achieved by operating somewhat in the Saturated Regime. However, regardless of the regime in which the network is operated, each of the VCs get fair treatment, e.g., the ability to transmit at its CIR at all times and have access to an equitable share of any currently available excess bandwidth. Moreover, equalization from arbitrary initial conditions is typically exponentially fast with rate proportional to $\gamma$, the damping constant.

II. Methods for Adaptive Control of Windows and Rates in Data Networks

This section describes the methods which are used in conjunction with a FCFS service discipline to control window size and data rates for sources $S_j$ in FIG. 2. The following section describes methods using a WRR discipline and for combinations of WRR disciplines with FCFS disciplines.

In the high speed network of FIG. 2, time is slotted, i.e., time is divided into intervals of length $\Delta$. Values for $\Delta$ generally range from 0.1 to 10 times the typical round trip cell propagation VC delay, depending on the system processing capabilities. The choice of $\Delta$ is flexible, and network performance is typically robust over a wide range of values of $\Delta$. Moreover, the time slot $\Delta$ may be different for different VCs. The general method of operation is that the distant switch 204 broadcasts a 1-bit message indicating the state of congestion once every slot to all sources of VCs passing through the switch. In preferred embodiments the operations can be made somewhat different and more economical: the switch broadcasts at the time of the first departure of a packet in every time slot. Thus, during idle periods, the switch may not broadcast for several (or many) slots. The source compensates for lack of explicit notification during the idle periods by inferring that the switch's buffer content was below the threshold.

Let $K_{j,I}$ denote the "ideal window" for $VC_j$ ($j=1,2, \ldots, C$) in the Ith slot, i.e., in the time interval $((I-1)\Delta, I\Delta)$. In this context "ideal" need not imply optimum or best window size in any absolute sense, but rather may refer to calculated or target window size. The following adaptation is advantageously implemented by the source at most once in every time slot, on first receipt of a 1-bit feedback message in that time slot.

$$K_{j,I} = (I - d(I)\gamma_j)K_{j,I-d(I)} - \alpha_j d(I)B_I (I=1,2, \ldots) \quad (2.1)$$

where $B_I \in \{-1, 1\}$ is the 1-bit message from the switch received by the source in the Ith slot. $B_I = 1$ if the buffer content at the switch exceeded the threshold $Q_T$ at the time the transmission of the message was initiated, and $B_I = -1$ otherwise. Note that the feedback bit $B_I$ is received, possibly at different times, by all sources. In (2.1), d(I) is the number of time slots since the switch last transmitted a feedback signal. Typically d(I) = 1. Finally, $\alpha_j$ is the gain and $\gamma_j$ is the damping constant for $VC_j$. More generally, it is possible to compute an ideal window (and, as demonstrated below, a rate) utilizing the previous l ideal windows and the previous l' one-bit messages. Although this may lead to more responsive behavior, the processing costs and design costs for setting parameters become much greater and therefore may not be appropriate in some applications. Thus, in a preferred embodiment only the prior ideal window size and most recently received one bit message are used.

The value of the ideal window in (2.1) when a VC turns on is influential in determining how much bandwidth the VC receives in the short-term. Various embodiments described later aim to make an appropriate selection for this initial value, using information on the VC's CIR and other network parameters.

For fixed gain $a$, two rather different forms of (2.1) are obtained when the damping constant $\gamma_j = 0$ and when $1 > \gamma_j > 0$. When $\gamma_j > 0$ the ideal window is computed with less weight placed on the past history of the window behavior and more relative weight given to the most recent feedback signal. This shift in relative weights allows the system to forget the distant past more easily, and actually aids the newly turned on VCs to obtain their share of the bandwidth. More generally when the gain is varied, the ratio $\alpha/\gamma$ determines the relative weightings given to the past history and the most recent feedback. Typical values (see FIG. 5) for these variable for a two-VC case are $\gamma_1 = \gamma_2 = 0.0025$, $Q_T = 12$, $\lambda = 264$, and $\tau = 1.0$. When more than two VCs are involved and when particular user requirements or network contraints dictate, other particular values for these quantities will prove useful to those skilled in the art. It often proves convenient to have $\alpha/\gamma$ approximately equal to $\lambda$.

Figure 3:
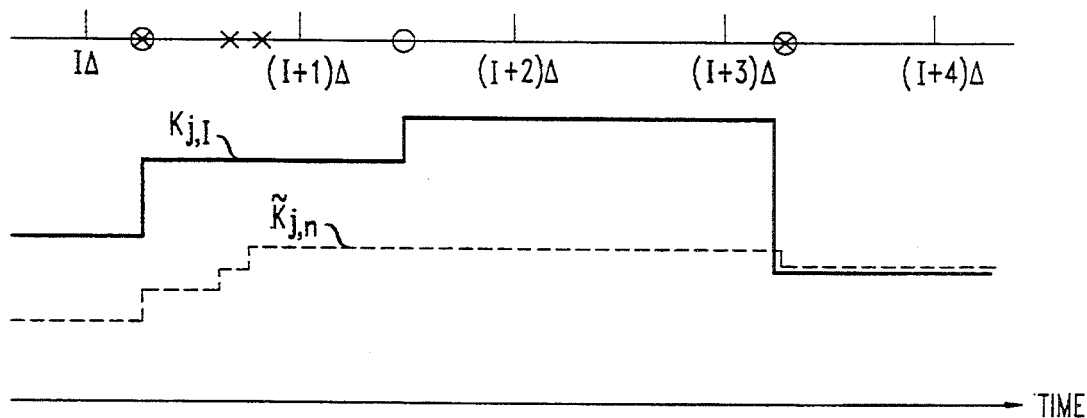
FIG. 3 illustrates sequences of ideal and actual window updates.

The actual implementation of (2.1) in a preferred embodiment is usually somewhat different, since it must take into account the integrality of the window length and the limited opportunities for reducing the window. Updating of the actual window is done at the source typically with every acknowledgement. Typically there are several acknowledgements in any time slot. Let n index the acknowledgements received by the source and let $\widetilde{K}_{j,n}$ denote the "actual window" of the $j^{th}$ VC. The actual window attempts to track the ideal window and the difference between the two windows is small, except for occasional, typically quite short, periods. Typically, the change in the actual window in any update is restricted to one of the following: $-1, 0, 1$. That is, $$\widetilde{K}_{j,n} = \widetilde{K}_{j,n-1} - 1 \text{ if } K_{j,I} \leq \widetilde{K}_{j,n} - 1^{-1} \quad (2,2,\text{i})$$

$$= \widetilde{K}_{j,n-1} \text{ if } \widetilde{K}_{j,n-1} - 1 < K_{j,I} < \widetilde{K}_{j,n} - 1 + 1 \quad (2,2,\text{ii})$$

$$= \widetilde{K}_{j,n-1} + 1 \text{ if } \widetilde{K}_{j,n-1} + 1 \leq K_{j,I} \quad (2,2,\text{iii})$$

where I is the interval in which the $n^{th}$ acknowledgement is received. FIG. 3 illustrates illustrative sequences of ideal and actual window updates. Note that when the actual window decreases, the size of the decrement is necessarily unity. In a preferred embodiment increments are also unity. However, in the more general case, increments may be larger.

Figure 4:
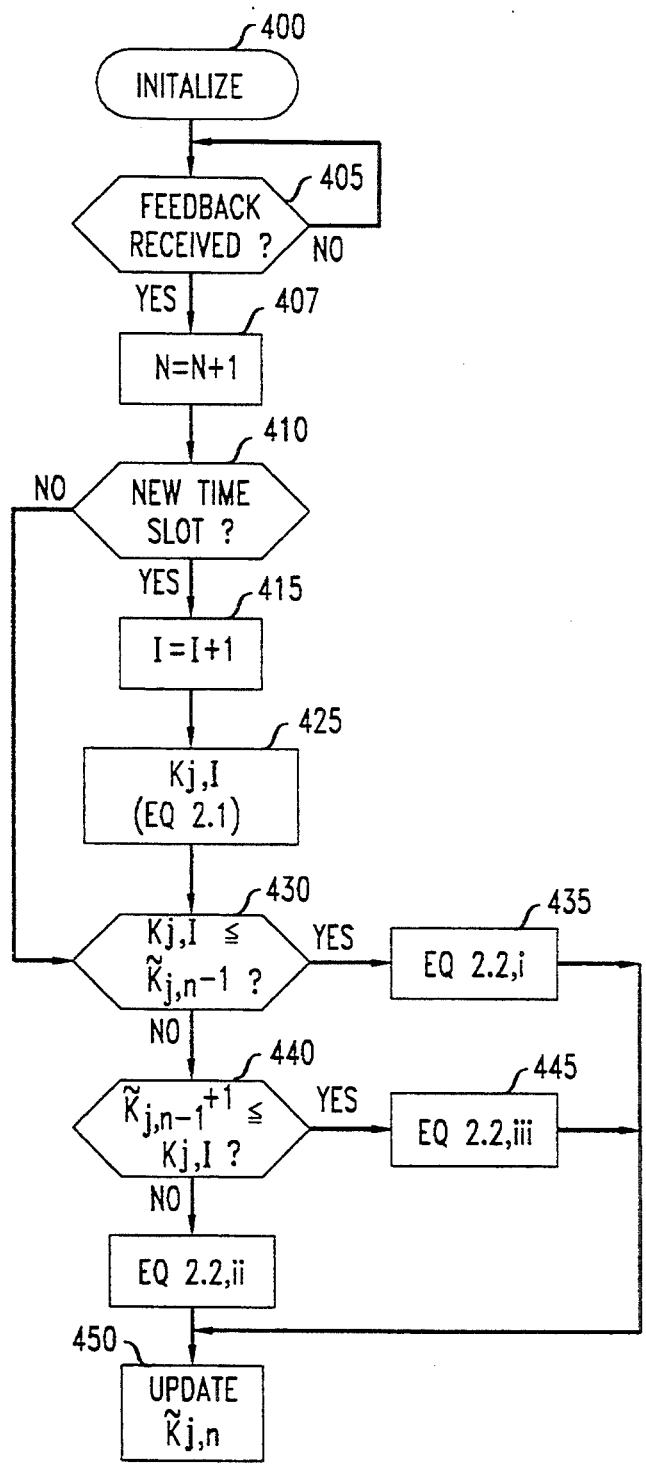
FIG. 4 illustrates a method for adaptively controlling window size using one-bit, explicit, periodic feedback and damping.

FIG. 4 is a flow chart illustrating an implementation of the updating of the window size in accordance with the above-described techniques. As shown in FIG. 4, values for the variables in Eqs. 2.1 and 2.2 are conveniently initialized in block 400. Receipt of a feedback signal is determined by the decision block 405, and n is incremented in block 407. If a new time slot has begun, I is incremented in block 415. Then a new ideal window is determined in block 425 in accordance with Eq. 2.1. If the current time slot has not expired, the same $K_{j,I}$ value is used unchanged. The ideal window value is then used in accordance with Eqs. 2.2 to update the value for the actual window in block 450. In particular, if the condition for Eq. 2.2,i is satisfied, then the actual window size is decremented via block 435 in accordance with Eq. 2.2,i. Likewise, if the condition for Eq. 2.2, iii is satisfied, then the window is incremented via block 445 in accordance with that equation; otherwise, Eq. 2.2,ii is used, and the window size is unchanged.

Figure 5:
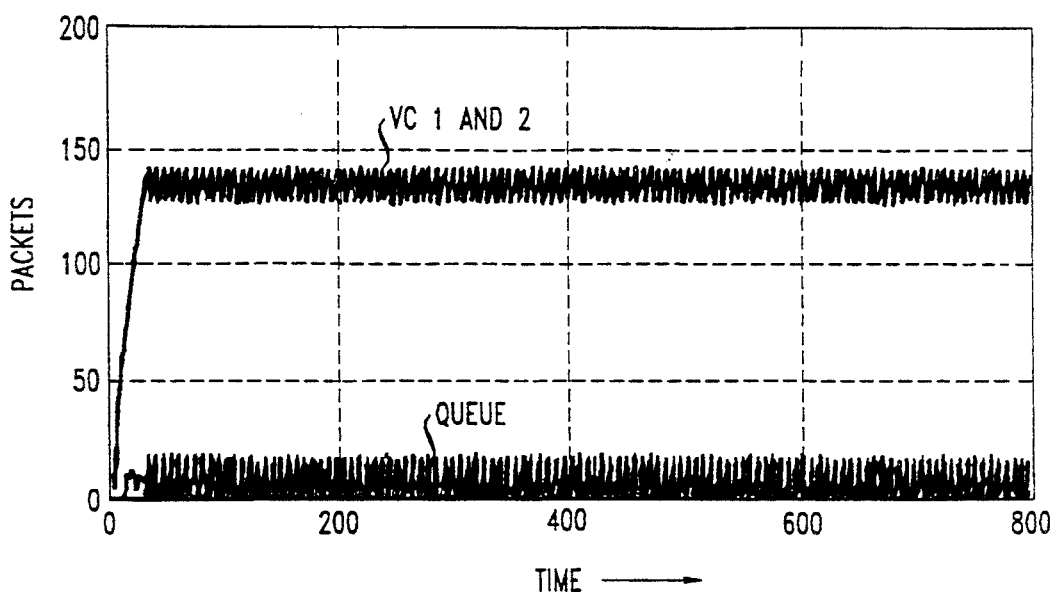
FIG. 5 is a graph of the performance of windows for two virtual circuits using the disclosed method.

Various modifications to (2.1), the updating algorithm for the ideal window, are described below. However, (2.2) advantageously remains fixed since its objective is simply to make the actual window closely track the ideal window. FIG. 5 is a graph showing windows for two VCs using the method described above. The upper plots depict the performance of two virtual circuits, VC1 and VC2, in terms of the window size as a function of time. Both virtual circuits are initially off, but when they are activated, the upper plots demonstrate that the virtual circuits each quickly receive approximately half the bandwidth allocation while the queue depth remains consistently relatively low as indicated in the lower plots. The selected parameters were: $\alpha_1 = \alpha_2 = 10/16$, $\Delta = 1/10$, $\gamma_1 = \gamma_2 = 0.0025$, $Q_T = 12$, $\lambda = 264$, $\tau = 1.0$. This figure indicates that the shortcomings of previous methods for window control, i.e. inequities between VCs, unfairness of bandwidth allocation, etc., are avoided. Both VCs are allocated an equal amount of bandwidth and the queue length remains at a manageable level.

In another embodiment of the method, (2.1) is modified to incorporate a mechanism called "Floor", which is motivated by the network's guarantee of the CIR. Say $CIR_j$ is the Committed Information Rate for the $j^{th}$ VC, and let $K_{j,floor} \triangleq \tau_j(CIR_j)$. The modified version of (2.1) is $$K_{j,I} = \max[K_{j,floor}, \{(1-d(I)\gamma_j)K_{j,I}-d(I)-\alpha_j d(I)B_I\}] \\ (I=1,2,\ldots) \quad (2.3)$$

To illustrate the power of the Floor, consider the situation during start-up of a $VC_j$ from an actual window which is, say, zero. Since the initial ideal window is at least $K_{j,floor}$, initially, while the actual window is less than the ideal window, the actual window grows exponentially. One of the effects of the Floor is to ensure that the ideal window never falls below the value corresponding to the CIR. Hence the effect of this mechanism is to ensure that the actual window grows quickly from arbitrary initial values to its CIR and thereafter, while the VC is active, never falls below it.

In a further embodiment, a mechanism called "Ramp-up" ensures that VCs realize their CIR soon after start-up. The procedure is as follows: first, the window corresponding to the CIR is calculated; next, all the packets in one window are transmitted during the interval $\tau$, corresponding to the round-trip delay of the VC, immediately after start-up without waiting for feedback. The recommended procedure is to transmit these packets uniformly spaced in time. This mechanism ceases to be operative after the initial period $\tau$ following start-up.

The mechanism of Ramp-up is an enhancement of Floor in that it gets the VC its CIR even faster after start-up. Ramp-up directly influences the actual window, while Floor affects the ideal window directly and the actual window indirectly. In Floor the actual window, while growing exponentially fast, will still take longer to attain its CIR from quiescence; in Ramp-up it is guaranteed to do so in one round-trip delay. The higher speed of response comes at the cost of higher packet queues at the distant switches.

In a further embodiment called "Ceiling", the method updates the ideal window to prevent it from exceeding a prespecified value, $K_{j,ceil}$:

$$K_{j,I} = sat_j[(1-d(I)\gamma)K_{j,I}-d(I)-\alpha_j d(I)B_I](I=1,2,\ldots) \quad (2.4)$$

where $\text{sat}_j(\cdot)$ is typically selected as:

$$\text{sat}_j(x) = x \text{ if } K_{j,floor} \leq x \leq K_{j,ceil} \quad (2.5)$$
$$= K_{j,floor} \text{ if } x < K_{j,floor}$$
$$= K_{j,ceil} \text{ if } x > K_{j,ceil}$$

In (2.5) $K_{j,floor}$ is the parameter associated with aforementioned Floor mechanism, which may be disabled at the operator's discretion by setting it to 0. Similarly, the Ceiling may be disabled by setting $K_{j,ceil}$ to a suitably large number (any number in excess of the window corresponding to the total bandwidth will suffice).

Ceiling prevents any one VC from obtaining more bandwidth than is implied by $K_{j,ceil}$, even when it is the sole active VC. Ceiling lessens the impact on the packet queue at the distant switch when a small number of VCs are active and several more turn on at about the same time. Without Ceiling the surge in the queue is much larger, which in turn calls for larger buffers if packet losses are to be avoided.

Lastly, a "Broadcasting" feature may advantageously be implemented by requiring the source of VCs to receive the periodic, 1-bit feedback signal from the distant node, and to update its ideal window even while quiescent. This feature allows quiescent VCs to know about currently available bandwidth, so that, at the time of transition to activity, the actual window (which is possibly zero) can grow rapidly to the ideal size. Of course if Floor and/or Ramp-up are already incorporated in the method, then the incremental benefit accrues when the ideal window is above the Floor. This situation arises when only a small number of VCs are active, and consequently excess bandwidth is available. A possible drawback of Broadcasting is that there is a surge in the queue at the distant node immediately after a VC turns on, which lasts for a very short interval before rapidly dissipating. The Floor, Ramp-up, Ceiling and Broadcasting features are typically well-suited to bursty traffic in VCs in which the source alternates between periods of activity and quiescence.

As has been mentioned earlier, rate adaptation closely parallels window adaptation. Let $R_{j,I}$ (the counterpart of $K_{j,I}$) denote the "ideal rate" for $VC_j$ ($j=1,2,\ldots,C$) in the $I^{th}$ slot. Its adaptation is implemented by the source at most once in every time slot, on receipt of a 1-bit feedback message, thus $$R_{j,I} = (1 - d(I)\gamma_j) R_{j,I-d(I)} - \alpha_j d(I) B_I (I = 1, 2, \ldots) \quad (2.6)$$

where $B_I$ is the 1-bit message from the switch received by the source in the $I^{th}$ slot. Here $d(I)$ is as defined earlier in (2.1), while $\gamma_j$ and $\alpha_j$ are again the damping and gain parameters. As with (2.1), (2.6) may be modified to incorporate information from many prior slots. In contrast to the window-based algorithms, there are no restrictions on the realization of the "actual rate" $\tilde{R}_{j,I}$, and hence the actual rate coincides with the ideal rate, i.e., $\tilde{R}_{j,I} = R_{j,I}$.

The source associated with the $VC_j$ uses the rate $R_{j,I}$ to determine the times for packet transmission during slot I in one of two ways: (i) the time between consecutive packet transmission is set to $1/R_{j,I}$; (ii) the time between consecutive packet transmission is random with a distribution, such as the exponential or the uniform, with mean set to $1/R_{j,I}$.

All the embodiments mentioned for the window-based adaptation have a rate-based equivalent as will be recognized by those skilled in the art. The CIR of a VC translates naturally to a floor for the rate, $R_{j,floor}$. For such a selection, the objective of Ramp-up is automatically satisfied in the rate-based framework. A maximum rate for the $VC_j$ translates to the ceiling parameter $R_{j,ceil}$. Broadcasting carries over without change.

III. Methods for Adaptive Control of Windows and Rates with the WRR Discipline

Figure 9:
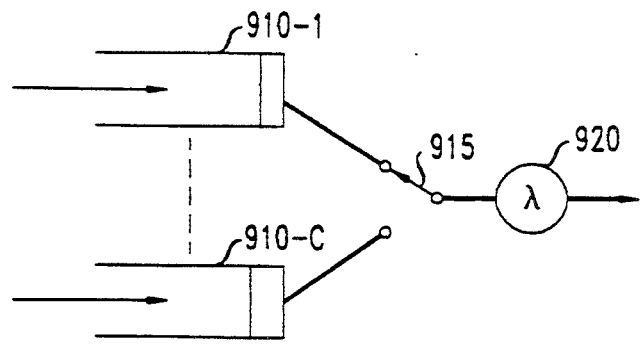
FIG. 9 is a block diagram of network with feedback control and Weighted Round Robin Service.
Figure 10:
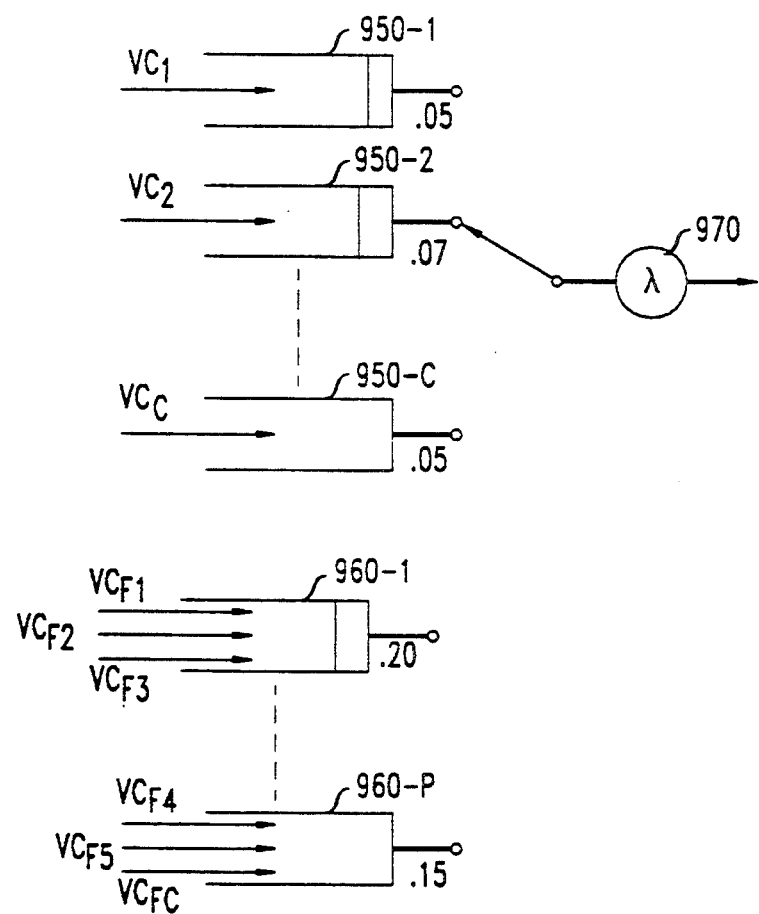
FIG. 10 is a block diagram of network with feedback control and combination of FCFS and WRR Service.

FIG. 9 shows an alternative buffering arrangement to that shown above in FIG. 3. In particular, FIG. 9 illustrates the so-called Round Robin buffering and resource allocation discipline. As in the FCFS discipline discussed in connection with FIG. 3, time is again slotted, with $\Delta$ denoting the time slot length, as before. Typical values for $\Delta$ will fall within the ranges cited above for the FCFS discipline.

It will be observed that each $VC_i$ has its own buffer 910-i, $i=1,2,\ldots,C$. Service is again provided by a server 920 with capacity (e.g., bandwidth) $\lambda$ operating on each of the VC queues in turn. The sequential nature of the servicing is represented by the scanner or commutator 915 in FIG. 9. Advantageously, service is provided only to buffers that contain packets to be transmitted. The Round-Robin discipline generally permits service to be provided in an unequal manner to the queues in buffers 910-1, i.e., the "weighting" may be unequal between the respective queues. Such weighting is characterized as the so-called Weighted Round-Robin discipline for allocating bandwidth (or other resource). In some cases, however, it may prove advantageous to employ equal weighting for all VC subject to Round-Robin queueing and allocation.

The individual buffers 910-i for the VCs may be separated only logically, i.e. in software through the use of pointers, while being physically co-located in a common memory. The aforementioned weights determine templates, which stipulate the order and frequency with which the switch processor services the individual buffers of the VCs. See M. Katevenis, S. Sidiropoulos and C. Courcoubetis, "Weighted Round-Robin Cell Multiplexing in a General-Purpose ATM Switch Chip", *IEEE J. on Selected Areas in Commun.*, Vol. 9, No. 8, October, 1991, pp. 1265-1279.

In contrast to the embodiments described above for the FCFS discipline, each VC buffer has its own threshold, $Q_{Tj}, j=1,2,\ldots,C$. The general idea is that a distant switch in a VC sends a feedback message exclusively to the source of the VC, at most once in every time slot, based on the status of its buffer content with respect to the threshold. As for FCFS, it proves advantageous to use a simple 1-bit feedback message. Again, as with the FCFS discipline, each VC maintains an "ideal window", which is adapted according to Eq. (2.1), as before. Also it proves advantageous to change the "actual window" in accordance with Eq. (2.2) with the objective of tracking the ideal window.

The WRR service discipline ensures isolation of individual VCs from the rest of the network and generally makes fairness easier to achieve as compared to method based on the FCFS discipline. Hence, damping is of less consequence and the damping parameter $\gamma_j$ for $VC_j$ may be set very small or zero. As in the FCFS case, the algorithm allocates spare bandwidth among active VCs, typically in proportion to their CIRs.

The primary role of the gains $\alpha_j$ is in determining the trade-off between speed of response just after a change in the number of active VCs, and the amplitude of fluctuations in the windows/rates after the network has settled. This trade-off is similar to the role of gains studied by D. Mitra and J. B. Seery in "Dynamic Adaptive Windows for High Speed Data Networks with Multiple Paths and Propagation Delays", *Computer Networks and ISDN Systems*, Vol. 25, pp. 663–679 (1993). It is also noteworthy that with the WRR the gain for any VC does not usually have to be carefully tuned to the round-trip propagation delay.

The embodiments Floor, Ramp-up and Ceiling described in the preceding section for the FCFS discipline are all applicable without change to the WRR discipline. The Broadcasting feature by its very nature does not apply to the WRR discipline. The adaptations for windows are modified for adaptations for rates, just as has been described in the preceding section for the FCFS discipline.

FIG. 10 shows the use of feedback-based adaptation in a network having one or more nodes which integrate the FCFS with the WRR service discipline. The overall network is of the type shown in FIGS. 1A, B, C and 2, with feedback based on congestion at a node. In such networks several VCs of Class 1, e.g., $VC_1$, $VC_2$..., $VC_c$, receive WRR service, i.e., each has its own buffer and a guaranteed proportion of the bandwidth. These proportions are illustratively indicated as 0.05, 0.07 and 0.05 for $VC_1$, $VC_2$ and $VC_c$, respectively. There are also several VCs of Class 2 which share a common buffer with other VCs. A proportion of the bandwidth is guaranteed for the common use of VCs of this class. In general, the FCFS VCs may advantageously be grouped as shown in FIG. 10. There, $VC_{F1}$, $VC_{F2}$, and $VC_{F3}$ are conveniently grouped for service in a single buffer 960-1, while $VC_{F4}$, ..., $VC_{FC}$ are grouped for service in the single buffer 960-P. Other similar groupings of FCFS VCs may, of course, be similarly grouped. Each of the FCFS buffers 960-i is conveniently assigned a proportion of the bandwidth $\lambda$ made available by serve 970. In the illustrative case shown in FIG. 10, buffer 960-1 is assigned 20 percent of the bandwidth and buffer 960-P is assigned 15 percent of the bandwidth. In some cases, all traffic from FCFS VCs can be combined in a single buffer having a single overall share of the bandwidth. In any event, packets within each FCFS buffer are assigned on an FCFS discipline. The packets in this shared buffer are serviced according to the FCFS discipline. There are similar shared buffers, serviced according to the FCFS discipline, for other classes of VCs.

The VCs of Class 1 adapt their windows/rates on the basis of periodically received feedback on the status of their private buffers. The adaptation methods are those used in conjunction with WRR service which have been described earlier in this section. The VCs of the other classes adapt their windows/rates on the basis of periodically received, feedback on the status of the respective shared buffer. The adaptation methods are those used in conjunction with FCFS service, and these have been described in Section II.

IV. Analytic Models

A. Introduction

This section discloses simple models of the adaptive method for the FCFS service discipline described in Section II above in which the packet streams are approximated by fluid flow. These fluid models do not have any stochastic elements and are described by systems of nonlinear delay-differential equations. The models are approximate; an important approximation is that the adaptation, as described in Section II, is periodic while in the model it is continuous. This approximation is acceptable as long as the periodic interval $\Delta$ is not large. This section demonstrates how to bridge results and parameters of the fluid models and those of the periodic, adaptive algorithms of the preceding sections. The results of the analytic models of this section give clear guidelines for the design of parameters in the adaptive algorithm.

B. Model

The model for a single virtual circuit (VC) is $$\frac{d}{dt} \phi(t) = -\Gamma \phi(t) - A \operatorname{sgn}[x(t - \tau/2) - x_T] \quad (4.1)$$

$$\begin{aligned}\frac{d}{dt} x(t) &= [\phi(t - \tau/2) - \lambda] \text{ if } x(t) > 0 \\ &= [\phi(t - \tau/2) - \lambda]^+ \text{ if } x(t) = 0\end{aligned} \quad (4.2)$$

Here $\phi$ (x) is the flow rate at time t and represents the fluid approximation to the local (in time) throughput of packets. Here $\tau$ is the round-trip propagation delay for the VC and $\lambda$ is the effective service rate at the distant switch, as shown in FIG. 2. The constant A and $\Gamma$ are the counterparts of the gain $\alpha$ and damping constant $\gamma$ in the adaptation algorithm for windows and rates given in (2.1) and (2.6), respectively. The classical queuing-theoretic steady state throughput, T, is approximated by the long-term average:

$$T \approx \lim_{t \to \infty} \frac{1}{t} \int_0^t \phi(\tau) d\tau \quad (4.3)$$

In (4.2) x(t) approximates the queue in packets at the distant switch and $x_T$ denotes the threshold. The nonlinear dynamics in (4.2) reflect the fact that the buffer content is nonnegative, i.e., $x(t) \geq 0$. Notice that a similar restriction which applies to $\phi(t)$ is not modeled. The reason is that the flow rate $\phi(t)$ is typically large in high speed data networks and the "floor" of $\phi(t)$ typically plays an insignificant role. This is in contrast to the design objective of small buffer contents.

The amount of fluid in the network at time t is approximated by K (t), where $$K(t) \approx \tau \phi(t). \quad (4.4)$$

Hence, denoting the mean of K(t) by $\langle K \rangle$, $$\langle K \rangle \tau T. \quad (4.5)$$

To establish the correspondence between the fluid model and the periodic method in Section II, observe that K(t) here is analogous to $K_I$ (see (2.1)). Moreover, approximating $$\frac{d}{dt} \phi(t) \approx \frac{\phi(t + \Delta) - \phi(t)}{\Delta}, \quad (4.6)$$

and making use of (4.1) and (4.4), yields $$K(t+\Delta) = (1 - \Gamma\Delta)K(t) - \tau A \Delta \operatorname{sgn}[x(t - \Gamma/2) - x_T].$$

On comparing with the recursion in (2.1), the following important correspondence between parameters of the fluid model and the adaptive algorithm is obtained:

$$\Gamma\Delta \approx \gamma A \tau \Delta \approx \alpha \quad (4.7)$$

In particular, the important ratio, $A/\Gamma \approx \alpha/(\tau\gamma)$.

C. Results for Different Regimes

The model of (4.1)–(4.2) shows that there are three regimes to consider:

Unsaturated Regime: $A/\Gamma < \lambda$ \quad (4.8,i)

Critical Case: $A/\Gamma = \lambda$ \quad (4.8,ii)

Saturated Regime: $A/\Gamma > \lambda$ \quad (4.8,iii)

The critical case will not receive much attention since it is handled by the analysis for one or the other regime.

Consider the Unsaturated Regime. For any nonnegative initial conditions $(\phi(0), x(0))$ a first proposition holds that:

(i) If $\phi(0) \leq A/\Gamma$ then \quad (4.9)
$\phi(t) \leq A/\Gamma \; (t \leq 0)$ (ii) There exists T such that $$x(t) = 0 (t \geq T) \quad (4.10)$$

(iii) For all initial conditions and $t > T + \tau/2$, $\phi(t)$ approaches the steady state, equilibrium value of $A/\Gamma$ at the exponential rate of $\Gamma$.

This can be demonstrated by noting:

(i) From (4.1), $$\frac{d\phi}{dt} \leq -\Gamma\phi(t) + A.$$

Hence, by considering $d\phi/dt$ when $\phi = A/\Gamma$, (4.5) follows.

(ii) Suppose that $\phi(t_0) > A/\Gamma$. Then for $t > t_0$, $$\phi(t) \leq \frac{A}{\Gamma} + e^{-\Gamma(t-t_0)}\left(\phi(t_0) - \frac{A}{\Gamma}\right).$$

Hence, there exists finite positive constants $T$, $\epsilon$ such that $(A/\Gamma) \leq \lambda - \epsilon$, and $$\phi(t) \leq \lambda - \epsilon (t \geq T) \quad (4.11)$$

From (4.2), for $t \geq T + \tau/2$ if $x(t) > 0$ then $\frac{d}{dt} x(t) \leq -\epsilon,$ \quad (4.12)

if $x(t) = 0$ then $\frac{d}{dt} x(t) = 0.$

Hence, (4.10) follows.

(iii) For $t \geq T + \tau/2$, $$\frac{d}{dt} \phi(t) = -\Gamma\phi(t) + A.$$

Hence, $$\phi(t) = \frac{A}{\Gamma} + e^{-\Gamma(t-T-\tau/2)}\left(\phi(T+\tau/2) - \frac{A}{\Gamma}\right).$$

It follows that in the Unsaturated Regime, the total fluid in the network is (see (4.4)), $$K(t) \to \tau A/\Gamma. \quad (4.13)$$

From (4.7), $\tau A/\Gamma \approx \alpha/\gamma$, where $\alpha$, $\gamma$ are parameters of the adaptive algorithms. Hence, it can be inferred that the mean window, $\langle K \rangle$, and the realized throughput, T, are $$\langle K \rangle \approx \frac{\alpha}{\gamma}, \text{ and } T \approx \frac{\alpha}{\tau\gamma} \quad (4.14)$$

Observe that the queue threshold $x_T$ in (4.1) does not have a role in determining the steady state values of $x(t)$ and $\phi(t)$, and in the Critical Case, see (4.8,ii), it may be shown that $$\phi(t) \to A/\Gamma (t \to \infty)$$

However, in contrast to the result for the Unsaturated Regime, there exist initial conditions for which the equilibrium buffer content is positive, but never in excess of $x_T$.

Proceeding to the Saturated Regime, in contrast to the other cases, there does not exist an equilibrium point. That is, a solution satisfying $$\frac{d}{dt}\phi(t) = \frac{d}{dt}x(t) = 0$$

Figure 6:
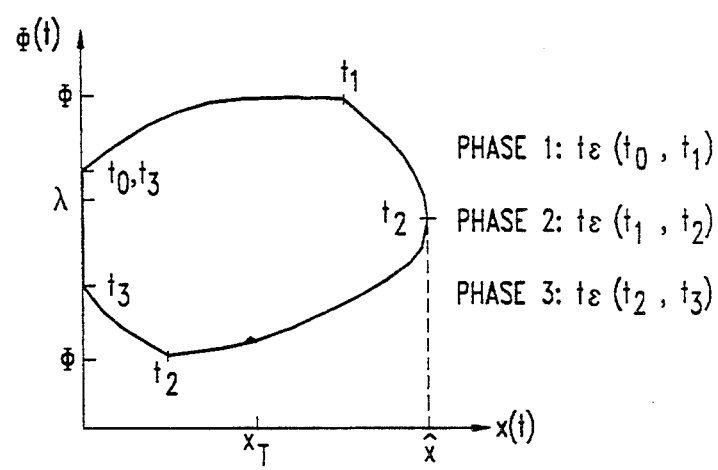
FIG. 6 is a graph of the periodic solution in the Saturated Regime.

By construction it can be shown that a unique periodic solution (limit cycle) exists in the Saturated Regime. This construction is related to a construction described in K. W. Fendick, M. A. Rodrigues and A. Weiss, "Analysis of Rate-Based Feedback Control Strategy for Long Haul Data Transport," *Performance Evaluation*, vol. 16, pp. 67–84, 1992. The main differences being the absence of damping and the presence of additional nonlinearities there. FIG. 6 is a graph of the periodic solution in the Saturated Regime. Start by postulating a point $t_0$ such that for $t \in [t_0 - \tau/2, t_0]$, $$\phi(t) = \frac{A}{\Gamma}[1 - e^{-\Gamma(\tau - t_0 + \tau/2)}] + \lambda e^{-\Gamma(t - t_0 + \tau/2)} \quad (4.15)$$

$$x(t) = 0$$

Note that the postulated $\phi(t)$ is a solution of the equations $$\left.\begin{array}{l}\frac{d}{dt}\phi(t) = -\Gamma\phi(t) + A \\ \phi(t_o - \tau/2) = \lambda\end{array}\right\} \quad (4.16)$$

It will be shown that at a later point, $t_3$, $$\phi(t_3 - s) = \phi(t_0 - s), \text{ and } x(t_3 - s) = x(t_0 - s)(0 \leq s \leq \tau/2) \quad (4.17)$$

This will establish the existence of a periodic solution to (4.1)–(4.2). There are three phases present in the limit cycle. In Phase 1, $t \in (t_0, t_1)$; in Phase 2, $t \in (t_1, t_2)$; in Phase 3, $t \in (t_2, t_3)$, where $t_1$, $t_2$ and $t_3$ are explicitly identified in the construction given below.

In Phase 1, $$0 < x(t - \tau/2) < x_T \text{ and } \lambda < \phi(t - \tau/2). \quad (4.18)$$

The governing equations are, $$\frac{d}{dt} \phi(t) = -\Gamma\phi(t) + A \quad (4.19)$$

$$\frac{d}{dt} x(t) = \phi(t - \tau/2) - \lambda$$

Hence, it is easily verified that in Phase 1, $$\frac{d}{dt} \phi(t) > 0 \text{ and } \frac{d}{dt} x(t) > 0. \quad (4.20)$$

The definition of the terminal time for this phase, $t_1$, is $$x(t_1 - \tau/2) = x_T \quad (4.21)$$

By solving (4.19), an explicit expression for $t_1$ is obtained. As shown in FIG. 6, $x(t_1)$ overshoots $x_T$.

Phase 2 terminates at $t_2$ where $$x(t_2 - \tau/2) = x_T \quad (4.22)$$

and during Phase 2, $$x_T < x(t - \tau/2). \quad (4.23)$$

Hence, the governing equations for Phase 2 are $$\frac{d}{dt} \phi(t) = -\Gamma\phi(t) - A \quad (4.24)$$

$$\frac{d}{dt} x(t) = \phi(t - \tau/2) - \lambda$$

Note that $d\phi/dt < 0$. Hence $x(t)$ is concave and reaches a maximum value $\hat{x}$ at time denoted by $t_2^*$. Also, $\phi(t_2) < \lambda$.

In Phase 3, $$\phi(t - \tau/2) < \lambda \text{ and } x(t - \tau/2) < x_T \quad (4.25)$$

The governing equations are $$\frac{d}{dt} \phi(t) = -\Gamma\phi(t) + A \quad (4.26)$$

$$\frac{d}{dt} x(t) = \phi(t - \tau/2) - \lambda \quad t_2 < t < t_3^*$$

$$= 0 \quad t > t_3^*$$

where $t_3^*$ is the time when the buffer first empties. Note that $d\phi/dt > 0$ and $dx(t)/dt \leq 0$. It is not hard to show that $\phi(t_3^* - \tau/2) < \lambda$. Hence, there exists $t_3 > t_3^*$ such that $\phi(t_3 - \tau/2) = \lambda$, which is the defining relation for $t_3$, the terminal time point of Phase 3 and the start of Phase 1. To see that the solution is periodic, i.e. (4.17) holds, it suffices to observe that the differential equations governing $\phi(t)$ in (4.16) and (4.26) are identical.

Note that the maximum value of $\phi(t)$, $\hat{\phi}$, is reached at $t = t_1$, and the minimum value, $\check{\phi}$, is reached at $t = t_2$.

A limiting case of the Saturated Regime is where the damping, $\Gamma = 0$ and $A/\Gamma = \infty$. Note that even in this case the limit cycle exists and is bounded. As it happens, the construction is simpler with $\Gamma = 0$ and the following explicit expressions are obtained for the extremal quantities, $\hat{x}$, $\hat{\phi}$ and $\check{\phi}$:

$$\hat{x} = \frac{A}{2}\left[\left(\frac{\tau}{2} + \sqrt{\frac{2x_T}{A}}\right)^2 + \left(\frac{3\tau}{2} + \sqrt{\frac{2x_T}{A}}\right)^2\right] \quad (4.27)$$

$$\hat{\phi} = \lambda + A\tau + \sqrt{2x_T A} \quad (4.28)$$

$$\check{\phi} = \lambda - A\tau - \left[(2A\tau + \sqrt{2Ax_t})^2 - \frac{3}{2}(A\tau)^2\right]^{\frac{1}{2}} \quad (4.29)$$

D. Fairness Among Virtual Circuits on a Common Path

This is a topic of obvious importance. The results here apply to all regimes. The extension of the model in (4.1)–(4.2) is, $$\frac{d}{dt} \phi_j(t) = -\Gamma_j \phi_j(t) - A_j \operatorname{sgn}[x(t - \tau_j/2) - x_T] \quad (4.30)$$

$$(j = 1, 2, \ldots, C) \quad (4.30)$$

$$\frac{d}{dt} x(t) = \left[\sum_j \phi_j(t - \tau_j/2) - \lambda\right] \quad \text{if } x(t) > 0 \quad (4.31)$$

$$= \left[\sum_j \phi_j(t - \tau_j/2) - \lambda\right]^+ \quad \text{if } x(t) = 0$$

In this section the restriction that all C VCs share a common path, i.e., $\tau_j \equiv \tau$ ($j = 1, 2, \ldots, C$), is imposed.

Now suppose that the desired fractional throughput to the $j^{th}$ VC is $\sigma_j$ ($j = 1, 2, \ldots, C$), where $\{\sigma_j\}$ is any set of positive numbers which sum to unity. That is, it is desired that $$\frac{\phi_i}{\phi_j} = \frac{\sigma_i}{\sigma_j} \quad (i, j) \quad (4.32)$$

Consider a second proposition: let the design rule be ($j = 1, 2, \ldots, C$)

$$\Gamma_j = \Gamma, A_j = \sigma_j A \quad (4.33)$$

where $(A, \Gamma)$ are system parameters. Then:
(i) For any two VCs, say the $i^{th}$ and $j^{th}$, the following measure of divergence, $$\left[\frac{\phi_i(t)}{\sigma_i} - \frac{\phi_j(t)}{\sigma_j}\right]$$

goes to 0 exponentially fast with rate $\Gamma$, regardless of initial condition and regime; i.e., $$\left[\frac{\phi_i(t)}{\sigma_i} - \frac{\phi_j(t)}{\sigma_j}\right] = e_{-\Gamma t}\left[\frac{\phi_i(0)}{\sigma_i} - \frac{\phi_j(0)}{\sigma_j}\right](t \geq 0) \quad (4.34)$$

(ii) Define $$\phi(t) = \sum_{j=1}^{C} \phi_j(t) \quad (4.35)$$

(It is already known from (i) that $\phi_j(t) \to \sigma_j \phi(t)$.) $\phi(t)$ is obtained as the solution of the model in (4.1)–(4.2) for a single VC. In particular, depending upon whether $A/\Gamma$ is less than or greater than $\lambda$, the behavior of φ(t) is described by the results for the Unsaturated and Saturated Regimes above.

This may be proven by noting: (i) From (4.30) and (4.33), for any i and j, $$\frac{1}{\sigma_i}\left(\frac{d}{dt}\phi_i(t) + \Gamma\phi_i\right) = \frac{1}{\sigma_j}\left(\frac{d}{dt}\phi_j(t) + \Gamma\phi_j\right). \quad (4.36)$$

Define $$\psi(t) = \frac{1}{\sigma_i}\phi_i(t) - \frac{1}{\sigma_j}\phi_j(t). \quad (4.37)$$

Then, $$\frac{d}{dt}\psi(t) = -\Gamma\psi(t)$$

from which (4.34) follows.

(ii) From (4.30), (4.31) and (4.33), $$\frac{d}{dt}\phi(t) = -\Gamma\phi(t) - A\,\text{sgn}[x(t - \tau/2) - x_T] \quad (4.38)$$

$$\frac{d}{dt}x(t) = [\phi(t - \tau/2) - \lambda] \quad \text{if } x(t) > 0 \quad (4.39)$$

$$= [\phi(t - \tau/2) - \lambda]^+ \quad \text{if } x(t) = 0$$

These equations are identical to (4.1)–(4.2), the governing equations for a single VC.

E. Multiple Virtual Circuits, Multiple Paths

Here the restriction in the preceding section which required that all VCs have a common value of the delay is removed. The model here is (4.30)–(4.31) with $\{\tau_j\}$ arbitrary. Then consider a third proposition: let the desired fractional allocation of throughput to the $j^{th}$ VC be $\sigma_j$, as in the second proposition. Let the design rule be given by (4.33). (Note that this design rule is oblivious of the delays in the multiple paths.) Also suppose that the Unsaturated Regime holds, i.e., $A/\Gamma < \lambda$. Then, using techniques similar to those above, it can be shown that:

(i) If $$\phi_j(0) \leq \sigma_j(A/\Gamma) \text{ then } \phi_j(t) \leq \sigma_j(A/\Gamma) \,(t \geq 0) \quad (4.40)$$

(ii) There exists $T < \infty$ such that $x(t) = 0$ for $t \geq T$.

(iii) For any initial condition and $t > T + \tau_j/2$, $\phi_j(t)$ approaches the equilibrium value of $\sigma_j(A/\Gamma)$ exponentially fast with rate $\Gamma$.

The important feature of the result is that neither the design rule nor the equilibrium values of the flow rates and the buffer content depends on the delays $\{\tau_j\}$. However, the translation of the above design rule (from the fluid model) to the adaptive algorithms introduces dependence on the delays. With large t the sum of all the flow rates, $\Sigma\phi_j(t)$, approaches $A/\Gamma$ which, in the Unsaturated Regime, is less than the switch capacity, $\lambda$. Hence, $(\lambda - A/\Gamma)$ is unutilized capacity, and fairness among all VCs as above holds here.

There is not a precise mathematical result which parallels the remarks on fairness above when the system is in the Saturated Regime. The relation (4.36) does not hold since the feedback bit streams are different for VCs with different propagation delays. Nonetheless, their time-averages are virtually identical since the signal emanates from a common point, the buffer at the distinct switch. It has been observed that the fairness results of the second proposition hold consistently for the model with various propagation delays and with the network in the Saturated Regime.

F. Implications for Design of the Periodic Adaptation Algorithm

This section summarizes the design implications of the analysis, which has been based on fluid models. The focus is on two topics: first, the relative merits of operating in the Unsaturated and Saturated Regimes; second, the translation of the design rules to the periodic adaptation algorithm, where the objects are fairness and specific fractional bandwidth allocations, possibly in the presence of various delays.

Figure 7A:
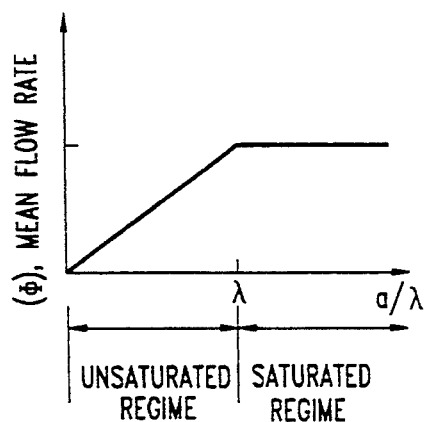
FIG. 7 is a graph of the mean flow rate and mean buffer content in different regimes.
Figure 7B:
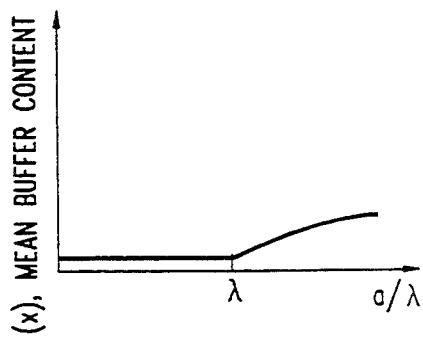

FIGS. 7A and B illustrate some of the characteristics of the fluid model behavior. In the Unsaturated Regime the main features are oscillation-free approach to equilibrium, linear growth of throughput with increasing $(\alpha/\gamma)$, empty buffers in equilibrium, unutilized switch capacity of $\lambda - \alpha/\gamma$. In the Saturated Regime the unutilized capacity is zero, there is no equilibrium point, instead limit cycles exist and the throughput and queue fluctuate around $\lambda$ and the threshold, respectively. These fluctuations are bounded and, moreover, the algorithm is surprisingly robust, i.e., the penalty for saturation is surprisingly small. More precisely, the growth of $(\hat{\phi} - \lambda)$ and $(\hat{x} - x_T)$, where $\hat{\phi}$ and $\hat{x}$ denote maximum values of the flow rate and queue, with $$\frac{\alpha}{\lambda\gamma}$$

is surprisingly slow. This gives rise to the following conclusion: it is not necessary to operate the network in an overly cautious mode.

Figure 8A:
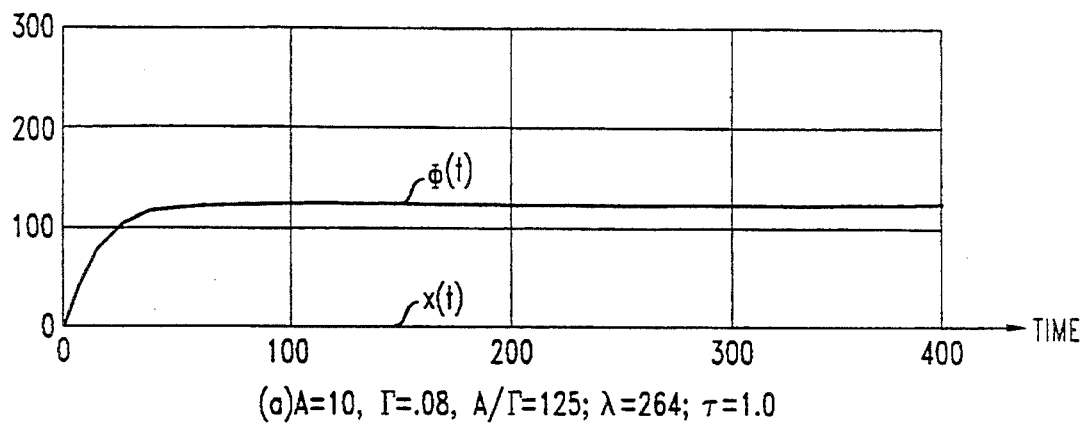
FIG. 8 is a graph of solution to the fluid models for the different regimes.
Figure 8B:
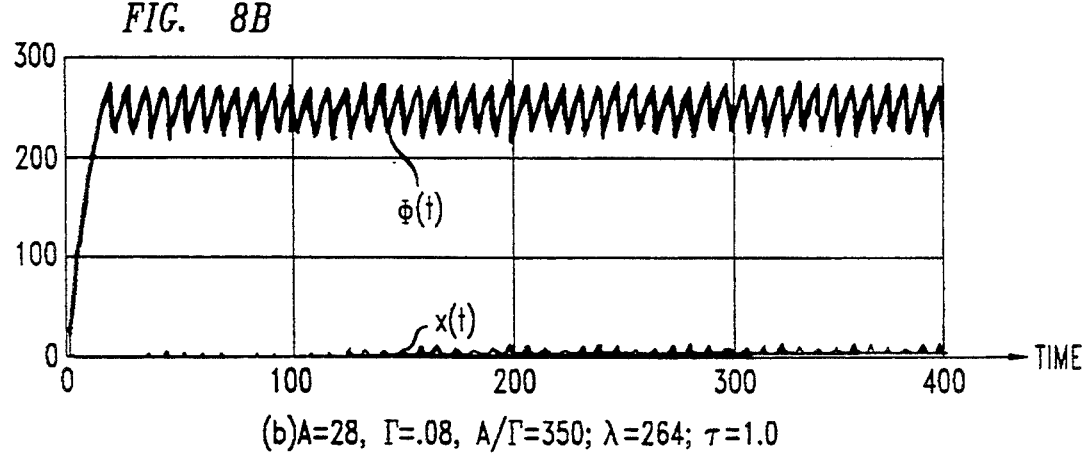
Figure 8C:
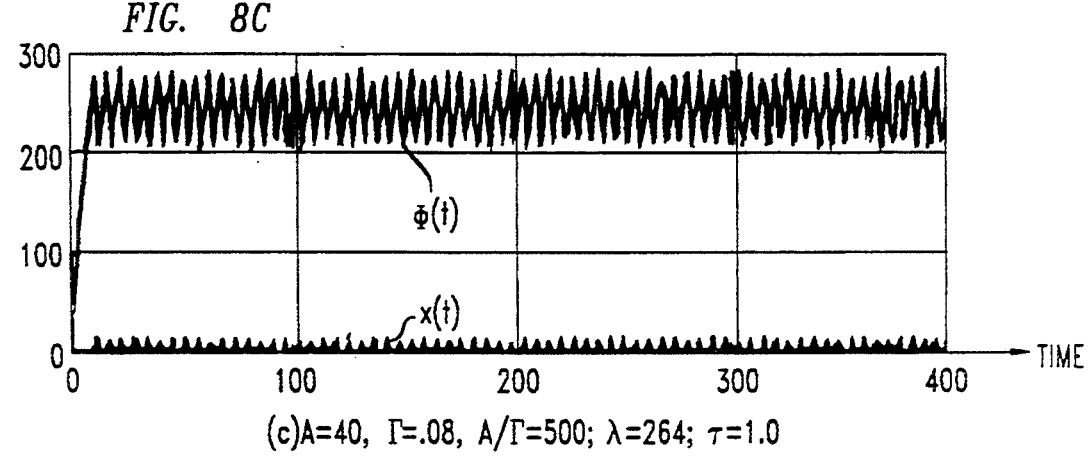

All this is demonstrated in FIG. 8 where $\lambda = 264$. In FIG. 8A $A/\Gamma = 125$ and the network is unsaturated. In contrast, the network is saturated in FIG. 8B and FIG. 8C. Even when $A/\Gamma$ is almost twice as large as $\lambda$, the oscillation and queue are not excessive.

To obtain the design rules for the adaptation algorithm start with (4.33). Following (4.7) let $\gamma_j = \Gamma_j\Delta$ and $\alpha_j = A_j\tau_j\Delta$. On denoting $(\Gamma\Delta)$ by $\gamma$ and $(A\Delta)$ by $\alpha$, obtain $$\gamma_j = \gamma \quad (4.41)$$
$$(j = 1, 2, \ldots, C)$$
$$\alpha_j = \sigma_j\tau_j\alpha$$

In this design rule the parameters $\{\alpha_j, \gamma_j\}$, of which there are 2 C, are obtained from just $(\alpha, \gamma)$. The manner in which the two parameters affect system behavior may be inferred from their effects on a network with a single VC. In particular, in the simulations of a single VC the regime is Unsaturated or Saturated depending upon whether $\alpha/\gamma$ is less than or greater than $\tau\lambda$.

The above detailed description has illustrated several methods for adaptive control of windows and rates in data networks. buffer. The methods have not been limited to specific hardware or software. Instead, the methods have been described in such a manner that those skilled in the art can readily adapt such hardware or software as may be available or preferable. The methods described have other network applications. For example, the feedback-based methods for fairly allocating bandwidth in a timely manner can be advantageously integrated with an access regulator, which interfaces with the user at the network edge. A simple, effective access regulator is the "Leaky Bucket" device, which polices and smooths traffic. An illustrative techniques for such integration makes the token rate in the Leaky Bucket regulator grow and subside like the rate for the VC, which is determined by feedback methods, possibly in conjunction with similar adjustments for the token buffer.

We claim:

1. In a network comprising a node and a virtual circuit passing through said node, said virtual circuit having a window of a size K having K packets of data in transit from a data source via said virtual circuit, a method of controlling said size K of said window comprising the steps of:
   sending a feedback signal during a time slot from said node to a point in said network connected to said data source, said feedback signal reflecting an indication of congestion in said network;
   determining at said point an ideal window of a size K based on said feedback signal and on a damping constant, said damping constant determining the relative weight accorded to a) the size of said ideal window in at least one prior time slot and b) said feedback signal, said size K of said ideal window reflecting an ideal number of packets in transit from said data source via said virtual circuit; and
   generating a window size control signal for controlling said window of said size K based on said ideal window.

2. The method of claim 1 wherein said feedback signal comprises a single bit.

3. The method of claim 2 wherein said single bit is set when congestion is encountered at said node.

4. The method of claim 1 wherein said window size control signal comprises a signal to said data source to send one or more additional packets to said network.

5. The method of claim 1 wherein said step of generating a window size control signal comprises generating a signal to control said size $\tilde{K}$ of said window upon an acknowledgment of receipt of the $n^{th}$ packet in the $\tilde{K}$ packets of data according to:

$$\begin{aligned}\tilde{K}_n &= \tilde{K}_{n-1} - 1 & \text{if } K_I \leq \tilde{K}_{n-1} - 1 \\ &= \tilde{K}_{n-1} & \tilde{K}_{n-1} - 1 < K_I < \tilde{K}_{n-1} - 1 \\ &= \tilde{K}_{n-1} + 1 & \tilde{K}_{n-1} + 1 \leq K_I\end{aligned}$$

where n is an index identifying the packet $\tilde{K}_n$ is said size of said window between acknowledgment of the $n-1^{th}$ and $n^{th}$ packets of data, and I is an index identifying the time slot during which said acknowledgement is received.

6. The method of claim 1 wherein said step of determining comprises determining:

$$K_I = (1 - d(I)\gamma)K_{I-d(I)} - ad(I)B_I (I=1, 2, \ldots)$$

where I is an index identifying the time slot during which said feedback signal was sent, $K_I$ is the size of said ideal window during said time slot, $\gamma$ is said constant, a is a gain constant, d(I) is the number of time intervals since said feedback signal was sent, and $B_I$ is said feedback signal.

7. The method of claim 6 wherein $B_I = 1$ if said feedback signal indicates congestion in said network and wherein $B_I = -1$ if said feedback signal indicates no congestion in said network.

8. In a network comprising a plurality of virtual circuits adapted to communicate packets of data between a set of nodes in said network, the $j^{th}$ of said virtual circuits having a window of a size $\tilde{K}_j$ having $\tilde{K}_j$ packets of data in transit from a data source via said $j^{th}$ virtual circuit, a method of controlling said size $\tilde{K}_j$ of said window comprising:
   sending a feedback signal during a time slot from a node in said set of nodes to a point in said network connected to said source, said feedback signal reflecting an indication of congestion in said network;
   determining at said point an ideal window of a size $K_j$ for said $j^{th}$ virtual circuit based on said feedback signal and on a damping constant, said damping constant determining the relative weight accorded to a) the size of said ideal window in at least one prior time slot and b) said feedback signal, said size $K_j$ of said ideal window reflecting an ideal number of packets in transit from said data source via said $j^{th}$ virtual circuit; and
   generating a window size control signal for controlling said window of said size $\tilde{K}_j$ based on said ideal window.

9. The method of claim 8 wherein said feedback signal comprises a single bit.

10. The method of claim 9 wherein said single bit is set when congestion is encountered in said network.

11. The method of claim 8 wherein said window size control signal comprises a signal to said data source to send one or more additional packets of data via said $j^{th}$ virtual circuit.

12. The method of claim 8 wherein said step of generating a window size control signal comprises generating a signal to control said size of said window $\tilde{K}_j$ upon acknowledgment of receipt of the $n^{th}$ packet in the $\tilde{K}_j$ packets of data according to:

$$\begin{aligned}\tilde{K}_{j,n-1} &= \tilde{K}_{j,n-1} - 1 & \text{if } K_{j,I} \leq \tilde{K}_{j,n-1} - 1 \\ &= \tilde{K}_{j,n-1} & \tilde{K}_{j,n-1} - 1 < K_{j,I} < \tilde{K}_{j,n-1} - 1 \\ &= \tilde{K}_{j,n-1} + 1 & \tilde{K}_{j,n-1} + 1 \leq K_{j,I}\end{aligned}$$

where n is an index identifying the packet, $\tilde{K}_{j,n}$ is the size of said window between acknowledgment of the $n-1^{th}$ and $n^{th}$ packets of data, and I is and index identifying the time slot during which said acknowledgment is received.

13. The method of claim 8 wherein said step of determining comprises determining:

$$K_{j,I} = (1 - d(I)\gamma_j)K_{j,I-d(I)} - a_j d(I)B_I (I=1, 2, \ldots)$$

where I is an index identifying the time slot during which said feedback signal was sent, $K_{j,I}$ is the size of the ideal window of said $j^{th}$ virtual circuit during said time slot, $\gamma_j$ is said constant for said $j^{th}$ virtual circuit, $a_j$ is a gain constant for said $j^{th}$ virtual circuit, d(I) is the number of time intervals since said feedback signal was sent, and $B_I$ is said feedback signal.

14. The method of claim 13, wherein $B_I = 1$ if said feedback signal indicates congestion in said network in excess of a predetermined threshold, and wherein $B_I = -1$ if said feedback signal indicates congestion in said network is not in excess of said threshold.

15. The method of claim 8 wherein said step of determining comprises determining:

$$K_{j,I}=\max[K_{j,floor},\{(1-d(I)\gamma_j)K_{j,I-d(I)}-a_jd(I)B(I_j)\}] (I=1, 2, \ldots)$$

where I is an index identifying the time slot during which said feedback signal was sent, $K_{j,I}$ is the size of the ideal window during said time slot, $\gamma_j$ is said constant for said $j^{th}$ virtual circuit, $a_j$ is a gain constant for said $j^{th}$ virtual circuit, d(I) is the number of time intervals since said feedback signal was sent, $B_I$ is said feedback signal, and $K_{j,floor}=\tau_j$(CIR) where $\tau_j$ is the round trip delay time for said $j^{th}$ virtual circuit and $CIR_j$ is the committed information rate for said $j^{th}$ virtual circuit.

16. The method of claim 8, wherein each of said nodes comprises a buffer memory for receiving packets of data from a preceding node, and wherein said feedback signal indicates the level of data relative to a predetermined threshold level.

17. The method of claim 8, wherein each of said nodes comprises a buffer memory for receiving packets of data from a preceding node for said $j^{th}$ virtual circuit, and wherein said feedback signal indicates the level of data relative to a predetermined threshold level $Q_{T,j}$ for the $j^{th}$ virtual circuit.

18. The method of claim 17 wherein said buffer memory is serviced on a first-come-first-served basis.

19. The method of claim 17 wherein said buffer memory is serviced using a weighted round robin discipline.

20. In a network a method of controlling a rate of input of packets of data from a data source to said network comprising the steps of:
receiving a feedback signal during a time slot from said network at a point connected to said data source, said feedback signal reflecting an indication of congestion in said network;
determining at said point a rate R based on said feedback signal and on a damping constant, said damping constant determining the relative weight accorded to a) the size of said ideal window in at least one prior time slot and b) said feedback signal; and
responsive to said receiving, generating a rate control signal for setting to R said rate of input of packets of data from said data source to said network.

21. The method of claim 20 wherein said feedback signal comprises a single bit.

22. The method of claim 21 wherein said single bit is set when there is congestion in said network.

23. The method of claim 20 wherein said step of determining comprises determining:

$$R_I=(1-d(I)\gamma)R_{I-d(I)}-ad(I)B_I (I=1, 2, \ldots)$$

where I is an index identifying the time slot during which said feedback signal was sent, $R_I$ is said rate during said time slot, $\gamma$ is said constant, a is a gain constant, d(I) is the number of time intervals since said feedback signal was sent, and $B_I$ is said feedback signal.

24. In a network comprising a plurality of virtual circuits adapted to communicate packets of data between a set of nodes in said network, a method of controlling the rate of input of packets of data from a data source to said network via the $j^{th}$ virtual circuit comprising the steps of:
receiving a feedback signal from said network at a point connected to a data source, said feedback signal reflecting an indication of congestion in said $j^{th}$ virtual circuit;
determining at said point a rate $R_j$ based on said feedback signal and on a damping constant, said damping constant determining the relative weight accorded to a) the size of said ideal window in at least one prior time slot and b) said feedback signal; and
responsive to said receiving, generating a rate control signal for setting to $R_j$ said rate of input of packets of data from said data source.

25. The method of claim 24, wherein each of said nodes comprises a buffer memory for receiving packets of data from a preceding node, and wherein said feedback signal indicates the level of data relative to a predetermined threshold level.

26. the method of claim 25 wherein said buffer memory is serviced on a first-come-first-served basis.

27. The method of claim 25 wherein said buffer memory is serviced using a weighted round robin discipline.

28. The method of claim 24 wherein said step of determining comprises determining:

$$R_{j,I}=(1-d(I)\gamma_j)R_{j,I-d(I)}-a_jd(I)B_I (I=1, 2, \ldots)$$

where I is an index identifying the time slot during which said feedback signal was sent, $R_{j,I}$ is said rate of said $j^{th}$ virtual circuit during said time slot, $\gamma_j$ is said constant for said $j^{th}$ virtual circuit, $a_j$ is a gain constant for said $j^{th}$ virtual circuit, d(I) is the number of time intervals since said feedback signal was sent, and $B_I$ is said feedback signal.

* * * * *

UNITED STATES PATENT AND TRADEMARK OFFICE
CERTIFICATE OF CORRECTION

PATENT NO. : 5,426,635
DATED : June 20, 1995
INVENTOR(S) : Debasis Mitra, et al

It is certified that error appears in the above-indentified patent and that said Letters Patent is hereby corrected as shown below:

Claim 20, Column 23, line 41, replace "size of said ideal window"
   with --rate R as determined--

Claim 24, column 24, line 24, replace "size of said ideal window"
   with --rate R as determined--.

Signed and Sealed this

Seventeenth Day of December, 1996

Attest:

BRUCE LEHMAN

*Attesting Officer*     *Commissioner of Patents and Trademarks*